United States Patent

[11] 3,601,765

| [72] | Inventor | John S. Miller<br>Long Beach, Calif. |
|---|---|---|
| [21] | Appl. No. | 882,180 |
| [22] | Filed | Dec. 4, 1969 |
| [45] | Patented | Aug. 24, 1971 |
| [73] | Assignee | The United States of America as represented by the Secretary of the Air Force |

[54] CONNECTOR COUPLING RING GAP CLOSURE DEVICE
1 Claim, 2 Drawing Figs.

[52] U.S. Cl. ............................................. 339/89 C, 339/143 R, 339/177 E
[51] Int. Cl. .............................................. H01r 13/54
[50] Field of Search ............................................. 339/143, 89, 177, 245; 174/35, 75.2, 88.2, 89

[56] References Cited
UNITED STATES PATENTS

| 1,993,014 | 3/1935 | Mascuch | 123/169 |
| 2,498,335 | 2/1950 | Hunt | 174/75.2 |
| 2,754,487 | 7/1956 | Carr et al. | 339/177 X |
| 3,037,069 | 5/1962 | Wilson | 339/177 X |

Primary Examiner—Richard E. Moore
Attorneys—Harry A. Herbert, Jr. and Robert Kern Duncan ABSTRACT: The invention is a device which attaches to circular cable connectors in such a way as to provide an external path to ground for radio frequency interference (r.f.i.) currents which would otherwise enter the internal cable wires. It comprises a backshell with two threaded rings of r.f.i. conducting material. One ring which is called the backshell retaining ring and which is threaded on the inside and outside engages the backshell and is then screwed onto the threaded cable connector thereby connecting the backshell and cable connector. The other ring is attached by threads to the outside of the first ring and, after the backshell and cable connector have been joined, is rotated toward the cable connector until it makes firm contact with the cable connector's coupling ring which has already been tightened into position. Once the connection is made between the coupling ring and the outer ring of the device the r.f.i. currents follow the path from the coupling ring to the outer ring of the device, to the backshell retaining ring, to the backshell, and on to ground.

PATENTED AUG24 1971 3,601,765

INVENTOR.
JOHN S. MILLER

CONNECTOR COUPLING RING GAP CLOSURE DEVICE

BACKGROUND OF THE INVENTION

1. Field of the invention

The invention is in the field of shielded cable connectors.

2. Description of the Prior Art

Previous devices provided no effective conducting connection between the outer surface of the connector coupling ring and the outer surface of the backshell retaining ring. Because of this gap, r.f.i. currents passed from the outside of the connector coupling ring to the inside of the connector coupling ring and on to the internal cable wires. The subject invention provides an adjustable means for closing this gap and removing the r.f.i. currents.

SUMMARY OF THE INVENTION

The invention comprises a backshell with a backshell retaining and a conducting ring attached by threads to the outside of the retaining ring which is screwed forward to make contact with the coupling ring of the cable connector to which the device is attached. Once the contact is made a path to ground is provided for the r.f.i. currents along the outside of the cable connector so the currents will not pass through the connector coupling ring and on to on to the internal cable wires.

DESCRIPTION OF THE PREFERRED EMBODIMENTS

Figure 1:
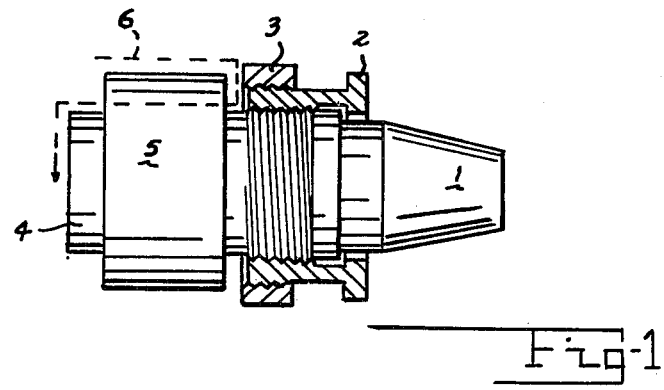
FIG. 1 is a drawing of the device attached to a cable connector before the outer ring is screwed forward to make contact with the connector coupling ring. It shows the path of the r.f.i. currents prior to closing the gap.
Figure 2:
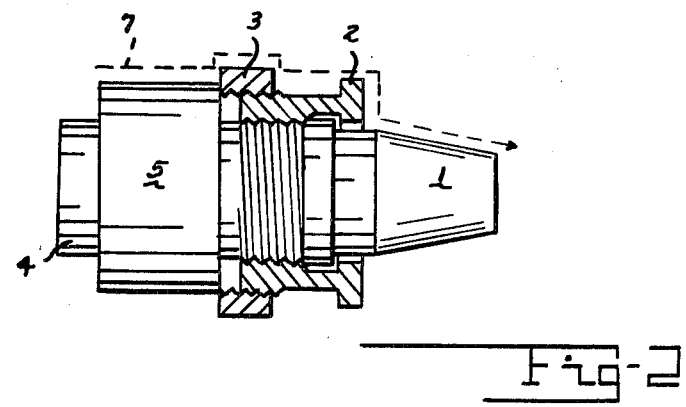
FIG. 2 is a drawing of the device attached to a cable connector with the outer ring contacting the connector coupling ring. It shows the oath of the r.f.i. currents after the gap has been closed.

Referring to FIG. 1, the device comprises a backshell 1, a backshell retaining ring 2 and an outer conducting ring 3. The backshell retaining ring engages the backshell, and then screws onto the threaded end of the cable connector shell 4, thereby connecting the backshell and the cable connector. The outer conducting ring which is threaded onto the backshell retaining ring is then in position to be screwed toward the connector coupling ring 5. Before the outer conducting ring contacts the coupling ring the r.f.i. currents can pass along path 6, from the outside of the connector coupling ring on in to the internal cable wires. FIG. 2 shows the device with the outer conducting ring contacting the connector coupling ring so that the r.f.i. currents can pass along path 7 from the connector coupling ring to the outer conducting ring of the invention to the backshell retaining ring to the backshell and on to the cable ground shield.

The device can be constructed from any r.f.i. conducting material. High permeability magnetic material has been found to be acceptable for frequencies below the 200 megahertz region.

Because the r.f.i. conduction contact between the device and the connector coupling ring is established by an adjustable threaded means, the device can be easily removed and attached to other cable connectors. Such ease of transition is not possible if the gap closure is effectuated by simply creating an elongated backshell retainer which makes contact with the connector coupling ring when it is screwed forward to the extend necessary to hold the backshell firmly against the cable connector.

I claim:

1. The improvement in an electrical cable coupling for reducing the entry of radio frequency interference currents into a conductor of the electrical cable, the said coupling having a cable connector shell for containing a lead connector and an external threaded portion for engagement with a retaining ring, a connector coupling ring arranged on said connector shell for tightening engagement with a mating connecting coupler, and a back back shell arranged on said connector shell for electrically connecting to a ground shield on said cable and having a flange for engagement with a flanged retaining ring, the said improvement comprising:

a. a retaining ring having internal threads in engagement with the external threads of the said connector shell and having a flange at one end arranged for engaging the flange of the said back shell and having external threads at the other end; and b. an outer conducting ring having internal threads in engagement with the said external threads of the said retaining ring, rotatably positionable along said threaded engagement to contact the connector coupling ring and close the gap between the coupling ring and the retainer ring.